US 6,352,758 B1

(12) United States Patent
Huang et al.

(10) Patent No.: US 6,352,758 B1
(45) Date of Patent: *Mar. 5, 2002

(54) PATTERNED ARTICLE HAVING ALTERNATING HYDROPHILIC AND HYDROPHOBIC SURFACE REGIONS

(75) Inventors: Tzu-Li J. Huang; John H. Ko; Dong-Wei Zhu; Bettie C. Fong, all of Woodbury, MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/071,968

(22) Filed: May 4, 1998

(51) Int. Cl.⁷ .............................. D06N 7/04; B05D 5/00; H05H 1/26
(52) U.S. Cl. .................. 428/143; 428/149; 428/164; 428/172; 428/180; 428/212; 427/198; 427/212; 427/397.8; 427/540; 427/554; 427/569; 264/482; 264/483
(58) Field of Search .................. 427/536, 539, 427/534, 540, 554, 180, 198, 201, 218, 219, 221, 397.7, 397.8, 569; 428/141, 143, 913, 149, 145, 180, 172, 156, 164, 212; 264/482, 483

(56) References Cited

U.S. PATENT DOCUMENTS

| | | | |
|---|---|---|---|
| 2,801,185 A | 7/1957 | Iler | 106/288 |
| 3,712,706 A | 1/1973 | Stamm | 350/103 |
| 3,787,467 A | 1/1974 | Lucking et al. | 260/448.8 |
| 3,924,929 A | 12/1975 | Holmen | 350/103 |
| 3,940,359 A | 2/1976 | Chambers | 260/29.6 F |
| 4,025,159 A | 5/1977 | McGrath | 350/105 |
| 4,177,315 A | 12/1979 | Ubersax | 428/336 |
| 4,188,451 A | 2/1980 | Humphery | 428/331 |
| 4,202,600 A | 5/1980 | Burke et al. | 350/103 |
| 4,243,618 A | 1/1981 | Van Arnam | 264/1 |
| 4,260,220 A | 4/1981 | Whitehead | 350/96.28 |
| 4,265,938 A | 5/1981 | Stanton et al. | 427/163 |
| 4,311,763 A | 1/1982 | Conroy | 428/412 |
| 4,340,319 A | 7/1982 | Johnson, Jr. et al. | 404/16 |

(List continued on next page.)

FOREIGN PATENT DOCUMENTS

| | | |
|---|---|---|
| EP | 052 427 A1 | 5/1982 |
| EP | 052 427 B1 | 5/1982 |
| EP | 153 289 | 8/1985 |

(List continued on next page.)

OTHER PUBLICATIONS

American Society for Testing and Materials, Designation: D 523–89, "Standard Test Method for Specular Gloss," pp. 33–37 (1989).

(List continued on next page.)

Primary Examiner—Donald J. Loney
(74) Attorney, Agent, or Firm—Carolyn A. Fischer

(57) ABSTRACT

An article is disclosed that has a patterned surface containing alternating hydrophobic and hydrophilic surface regions. The hydrophobic regions may be sufficiently narrow such that under dew conditions moisture accumulated on the hydrophobic region migrates to the hydrophilic region, thus preventing the accumulation of water droplets. In frost conditions, the hydrophobic region remains relatively frost-free, thus maintaining at least partial transparency of the surface. Inorganic oxide particles on the surfaces of the hydrophobic regions may provide abrasion resistance. A method for making the patterned surfaces is disclosed in which a treatment removes organic binder to expose inorganic oxide particles at the surface of the hydrophilic regions.

35 Claims, 2 Drawing Sheets

U.S. PATENT DOCUMENTS

| | | | | |
|---|---|---|---|---|
| 4,349,598 A | 9/1982 | White | | 428/161 |
| 4,409,285 A | 10/1983 | Swerdlow | | 428/332 |
| 4,440,590 A | 4/1984 | Collins et al. | | 156/234 |
| 4,455,205 A | 6/1984 | Olson et al. | | 204/159.13 |
| 4,476,281 A | 10/1984 | Vaughn, Jr. | | 524/767 |
| 4,478,876 A | 10/1984 | Chung | | 427/54.1 |
| 4,478,909 A | 10/1984 | Taniguchi et al. | | 428/331 |
| 4,481,254 A | 11/1984 | Fukushima et al. | | 428/329 |
| 4,486,504 A | 12/1984 | Chung | | 428/412 |
| 4,490,230 A | 12/1984 | Fletcher | | 204/228 |
| 4,491,508 A | 1/1985 | Olson et al. | | 204/159.13 |
| 4,518,649 A | 5/1985 | Wang et al. | | 428/284 |
| 4,522,958 A | 6/1985 | Das et al. | | 523/212 |
| 4,536,420 A | 8/1985 | Rickert, Jr. | | 427/257 |
| 4,571,365 A | 2/1986 | Ashlock et al. | | 428/412 |
| 4,576,850 A | 3/1986 | Martens | | 428/156 |
| 4,576,864 A | 3/1986 | Krautter et al. | | 428/328 |
| 4,588,258 A | 5/1986 | Hoopman | | 350/103 |
| 4,594,379 A | 6/1986 | Funaki et al. | | 524/114 |
| 4,596,662 A | 6/1986 | Walker et al. | | 252/8.5 |
| 4,596,745 A | 6/1986 | Chao | | 428/428 |
| 4,642,266 A | 2/1987 | Funaki et al. | | 428/412 |
| 4,664,960 A | 5/1987 | Ovshinsky | | 428/98 |
| 4,664,966 A | 5/1987 | Bailey et al. | | 428/203 |
| 4,682,852 A | 7/1987 | Weber | | 350/105 |
| 4,719,146 A | 1/1988 | Hohage et al. | | 428/331 |
| 4,726,706 A | 2/1988 | Attar | | 404/14 |
| 4,735,632 A | 4/1988 | Oxman et al. | | 51/295 |
| 4,753,548 A | 6/1988 | Forrer | | 404/15 |
| 4,755,425 A | 7/1988 | Huang | | 428/331 |
| 4,764,564 A | 8/1988 | Schmidt et al. | | 525/328.2 |
| 4,772,488 A | 9/1988 | Pinch et al. | | 427/39 |
| 4,775,219 A | 10/1988 | Appledorn et al. | | 350/103 |
| 4,797,024 A | 1/1989 | Forrer | | 404/16 |
| 4,814,207 A | 3/1989 | Siol et al. | | 427/393.5 |
| 4,818,596 A | 4/1989 | Cook et al. | | 428/265 |
| 4,837,069 A | 6/1989 | Bescup et al. | | 428/148 |
| 4,844,946 A | 7/1989 | Komatsu et al. | | 427/48 |
| 4,844,976 A | * 7/1989 | Huang | | 428/323 |
| 4,875,798 A | 10/1989 | May | | 404/12 |
| 4,885,332 A | 12/1989 | Bilkadi | | 524/714 |
| 4,895,428 A | 1/1990 | Nelson et al. | | 350/103 |
| 4,906,070 A | 3/1990 | Cobb, Jr. | | 350/286 |
| 4,906,523 A | 3/1990 | Bilkadi et al. | | 428/327 |
| 4,908,230 A | 3/1990 | Miller | | 427/54.1 |
| 4,929,666 A | 5/1990 | Schmidt et al. | | 524/516 |
| 5,006,624 A | 4/1991 | Schmidt et al. | | 526/243 |
| 5,042,924 A | 8/1991 | Terasaki et al. | | 359/500 |
| 5,053,177 A | 10/1991 | Vetter et al. | | 264/134 |
| 5,073,404 A | 12/1991 | Huang | | 427/39 |
| 5,104,929 A | 4/1992 | Bilkadi | | 524/847 |
| 5,117,304 A | 5/1992 | Huang et al. | | 359/529 |
| 5,126,394 A | 6/1992 | Revis et al. | | 524/548 |
| 5,134,021 A | 7/1992 | Hosono et al. | | 428/213 |
| 5,176,943 A | 1/1993 | Woo | | 428/64 |
| 5,177,304 A | 1/1993 | Nagel | | 588/201 |
| 5,210,248 A | 5/1993 | Babirad et al. | | 556/420 |
| 5,244,935 A | 9/1993 | Oshibe et al. | | 522/151 |
| 5,258,225 A | 11/1993 | Katsamberis | | 428/331 |
| 5,270,080 A | 12/1993 | Mino et al. | | 427/430.1 |
| 5,274,159 A | 12/1993 | Pellerite et al. | | 556/485 |
| 5,294,662 A | 3/1994 | Moore et al. | | 524/516 |
| 5,307,438 A | 4/1994 | Bilkadi et al. | | 385/141 |
| 5,314,980 A | 5/1994 | Morrison | | 528/19 |
| 5,316,825 A | * 5/1994 | Nakai et al. | | 428/156 |
| 5,324,566 A | * 6/1994 | Ogawa et al. | | 428/141 |
| 5,368,941 A | 11/1994 | Blizzard et al. | | 428/412 |
| 5,374,483 A | 12/1994 | Wright | | 428/412 |
| 5,382,639 A | 1/1995 | Moore et al. | | 526/243 |
| 5,391,210 A | 2/1995 | Bilkadi et al. | | 51/298 |
| 5,393,590 A | 2/1995 | Caspari | | 428/195 |
| 5,418,304 A | 5/1995 | Mueller et al. | | 526/245 |
| 5,541,049 A | 7/1996 | Ballerini et al. | | 430/527 |
| 5,608,003 A | 3/1997 | Zhu | | 524/516 |
| 5,667,335 A | 9/1997 | Khieu et al. | | 404/14 |
| 5,677,050 A | 10/1997 | Bilkadi et al. | | 428/331 |
| 5,706,133 A | 1/1998 | Orensteen et al. | | 359/530 |
| 5,708,048 A | 1/1998 | Medford et al. | | 520/64 |
| 5,760,126 A | 6/1998 | Engle et al. | | 524/516 |
| 5,820,978 A | 10/1998 | Huang | | 428/331 |
| 5,859,086 A | * 1/1999 | Freund et al. | | 522/83 |
| 5,880,212 A | 3/1999 | Nakagawa et al. | | 524/779 |
| 5,939,182 A | 8/1999 | Huang et al. | | 428/323 |
| 6,013,372 A | * 1/2000 | Hayakawa et al. | | 428/411.1 |

FOREIGN PATENT DOCUMENTS

| | | | |
|---|---|---|---|
| EP | 286 225 | | 10/1988 |
| EP | 337 695 | | 10/1989 |
| EP | 410 798 | | 1/1991 |
| EP | 424 007 | | 4/1991 |
| EP | 0 491 251 | | 6/1992 |
| EP | 0 492 545 | | 7/1992 |
| EP | 0 537 669 A1 | | 4/1993 |
| EP | 576 247 | | 12/1993 |
| EP | 0 620 255 | | 10/1994 |
| EP | 628 610 | | 12/1994 |
| EP | 675 087 | | 10/1995 |
| EP | 816 452 | | 1/1998 |
| GB | 2 249 041 | | 4/1992 |
| GB | 2249041 A | * | 4/1992 |
| JP | 59176329 | * | 10/1984 |
| JP | 59-176329 | | 10/1984 |
| JP | 02-260145 | | 10/1990 |
| JP | 3-41402 | | 2/1991 |
| JP | 3-50288 | | 3/1991 |
| JP | 711030 | * | 1/1995 |
| JP | 7-11030 | | 1/1995 |
| JP | 98-030040 | | 11/1997 |
| JP | 98 03 0040 | | 11/1997 |
| JP | 10028700 | | 2/1998 |
| WO | WO 92/17337 | | 10/1992 |
| WO | WO 95/16522 | | 6/1995 |
| WO | WO 95/30539 | | 11/1995 |
| WO | WO 95/32237 | | 11/1995 |
| WO | WO 96/21700 | | 7/1996 |
| WO | WO 96/36669 | | 11/1996 |
| WO | WO 97/00917 | | 1/1997 |
| WO | WO 97/00995 | | 1/1997 |
| WO | WO 97/01599 | | 1/1997 |
| WO | 9745502 | * | 12/1997 |
| WO | 97/45502 | | 12/1997 |
| WO | WO 99/02611 | | 1/1999 |

OTHER PUBLICATIONS

American Society for Testing and Materials, Designation: D–968–93, "Standard Test Methods for Abrasion Resistance of Organic Coatings by Falling Abrasive," pp. 87–90 (1993).

American Society for Testing and Materials, Designation: D–1000–93, "Standard Test Method for Pressure–Sensitive Adhesive–Coated Tapes Used for Electrical and Electronic Applications," pp. 320–337 (1993).

American Society for Testing and Materials, Designation: D–1003–61, "Standard Method of Test for Haze and Luminous Transmittance of Transparent Plastics," pp. 569–576 (1961).

American Society for Testing and Materials, Designation: D–1003–92, "Standard Test Method for Haze and Luminous Transmittance of Transparent Plastics," pp. 357–361 (1992).

American Society for Testing and Materials, Designation: D–1003–97, "Standard Test Method for Haze and Luminous Transmittance of Transparent Plastics," pp. 196–201 (1997).

American Society for Testing and Materials, Designation: D–1044–90, "Standard Test Method for Resistance of Transparent Plastics to Surface Abrasion," pp. 378–381 (1990).

American Society for Testing and Materials, Designation: D–1044–94, "Standard Test Method for Resistance of Transparent Plastics to Surface Abrasion," pp. 219–222 (1994).

American Society for Testing and Materials, Designation: D 2457–97, "Standard Test Method for Specular Gloss of Plastic Films and Solid Plastics," pp. 9–13 (1997).

American Society for Testing and Materials, Designation: D–2486–89, "Standard Test Method for Scrub Resistance of Interior Latex Flat Wall Paints," pp. 91–93 (1989).

American Society for Testing and Materials, Designation: D–2486–96, "Standard Test Method for Scrub Resistance Wall Paints," pp. 92–94 (1996).

American Society for Testing and Materials, Designation: D–3359–90, "Standard Test Methods for Measuring Adhesion by Tape Test," pp. 511–514 (1990).

American Society for Testing and Materials, Designation: D–3359–93, "Standard Test Methods for Measuring Adhesion by Tape Test," pp. 433–438 (1993).

American Society for Testing and Materials, Designation: D–3359–95a, "Standard Test Methods for Measuring Adhesion by Tape Test," pp. 355–361 (1996).

American Society for Testing and Materials, Designation: D–3359–97, "Standard Test Methods for Measuring Adhesion by Tape Test," pp. 368–374 (1997).

American Society for Testing and Materials, Designation: D–3884–92, "Standard Test Method for Abrasion Resistance of Textile Fabrics (Rotary Platform, Double–Head Method)," pp. 160–164 (1992).

American Society for Testing and Materials, Designation: D–4280–96, "Standard Specification for Extended Life Type, Nonplowable, Prismatic, Raised, Retroreflective Pavement Markers," pp. 430–436 (1996).

American Society for Testing and Materials, Designation: E–810–94, "Standard Test Method for Coefficient of Retroreflection of Retroreflective Sheeting".

American Society for Testing and Materials, Designation: G–26–88, "Standard Practice for Operating Light Exposure Apparatus (Xenon–Arc Type) with and without Water for Exposure of Nonmetallic Materials," pp. 963–971 (1988).

American Society for Testing and Materials, Designation: G–26–90, "Standard Practice for Operating Light–Exposure Apparatus (Xenon–Arc Type) With or Without Water for Exposure of Nonmetallic Materials," pp. 1069–1077 (1990).

American Society for Testing and Materials, Designation: G–26–96, "Standard Practice for Operating Light–Exposure Apparatus (Xenon–Arc Type) With or Without Water for Exposure of Nonmetallic Materials," pp. 1258–1267 (1996).

Floch et al., "A Scratch–Resistant Single–Layer Anti–reflective Coating by a Low Temperature Sol–Gel Route," *SPIE*, vol. 1758, Sol–Gel Optics II, pp. 135–149 (1992).

Iler, "The Chemistry of Silica," John Wiley & Sons, New York, title page, copyright page, table of contents (1979).

Lewis et al., "Ultraviolet–Curable, Abrasion–Resistant and Weatherable Coatings with Improved Adhesion", *J. of Appl. Polymer Science*, 42:1551–1556 (1991).

Pleuddeman, "Silane Coupling Agents," New York, title page, table of contents, pp. 20–23 and 96–99 (1982).

Schmidt, "Chemistry of Material Preparation By The SolGel Process", *J. Non–Cryst. Solids*, 100:51–64 (1988).

Zisman, W. A., "Contact Angle, Wettability and Adhesion," Advances in Chemistry, series 43, American Chemical Society, Washington, D.C., title page, copyright page, table of contents (1964).

* cited by examiner

PATTERNED ARTICLE HAVING ALTERNATING HYDROPHILIC AND HYDROPHOBIC SURFACE REGIONS

FIELD OF THE INVENTION

This invention relates to articles having patterns of alternating hydrophilic and hydrophobic regions on the surface, and methods for making same.

INTRODUCTION

Anti-dew coatings typically have hydrophilic surfaces that spread water droplets into a thin layer over the surface of the coatings. Anti-dew coatings have a variety of uses, such as on glass or plastic surfaces in greenhouses or indoor pools, and are especially useful on traffic signs that employ retroreflective sheeting.

Retroreflective sheeting has the ability to return a substantial portion of incident light in the direction from which the light originated. This unique ability has made retroreflective sheetings commonplace in traffic signs. Light from motor vehicle headlights is retroreflected by the sheeting to display information on the sign to the motor vehicle drivers.

Light transmission to and from a retroreflective traffic sign can be impaired by water droplets on the surface of the traffic sign. A prominent form of precipitation that affects light transmission is dew formation, which can be particularly problematic because it occurs predominantly at nighttime when the retroreflective sheetings are operative. Water droplets on traffics sign can significantly alter the path of incident and retroreflected light. This can make information on the sign much more difficult for passing motorists to read. Thus, the elimination or reduction of small beaded water droplets on the surface of a sign increases retroreflectance and readability by reducing the extent to which incident light is scattered or otherwise misdirected by water droplets on the surface of a sign.

To hamper water droplet formation in moist conditions, coatings have been applied to signs to evenly spread the water over the coating. Water-spreading coatings typically include inorganic particles and may also include an organic binder. For example: U.S. Pat. No. 4,576,864 to Krautter et al. discloses a water-spreading layer that is composed of colloidal particles of a metal or silicon oxide in which the water-spreading layer is adhered to a plastic substrate by an adhesive; U.S. Pat. No. 4,478,909 to Taniguchi et al. and U.S. Pat. No. 5,134,021 to Hosono et al. discloses an anti-fogging coating having finely divided silica particles dispersed in a matrix of polyvinyl alcohol and an organosilicon alkoxy compound or hydrolysates thereof; U.S. Pat. No. 4,409,285 to Swerdlow discloses a water-spreading coating comprising a mixture of large and small inorganic particles comprising colloidal silica and/or alumina; U.S. Pat. No. 4,481,254 to Fukushima et al. discloses an agricultural plastic film comprising an olefin resin and an amorphous hydrated aluminum silicate gel; U.K. Patent Application GB 2,249,041A to the Imperial College of Science, Technology and Medicine, discloses a modified hydrophobic plastic surface that has been subjected to an oxidation treatment and has a surface layer of colloidal hydrous metal oxide; Japanese Patent Kokai Publication No. HEI-3-50288 to Yamagishi et al. discloses an anti-fogging composition comprising a mixture of positively charged colloidal silica and alumina particles with a water-soluble aluminum salt and a nonionic surfactant; and U.S. Pat. Nos. 5,073,404, 4,844,946 and 4,755,425 to Huang disclose a retroreflective sheeting that has a transparent coating comprising colloidal silica and a polymer selected from aliphatic polyurethanes, polyvinyl chloride copolymers and acrylic polymers.

Other water-spreading layers are known that do not require inorganic particles. For example, U.S. Pat. No. 5,244,935 to Oshibe et al. discloses an ultraviolet curable anti-fogging composition agent comprising an acrylate or acrylamide block copolymer having a hydrophilic polymer segment and a hydrophobic polymer segment, a photopolymerizable compound, and a photoinitiator. The photopolymerizable compound has the formula $CH_2$=CHCOO$(CH_2CRHO)_n$OCCR=$CH_2$; when n=0, anti-fogging properties were not exhibited and when n>30, the resulting film was weak. U.S. Pat. No. 5,316,825 to Nakai et al. discloses an anti-fogging film made of a transparent synthetic resin having micro concavities of at most 10 $\mu$m in depth and 20 $\mu$m in width.

Other workers have reported that anti-fogging properties can be imparted to glass or surface-activated plastic substrates by reacting the substrate surfaces with silanol or siloxane-functionalized polymers or fluoropolymers. European Patent Application No. 0 620 255 A1 to Luckey, Ltd. reports that anti-fogging coatings can be produced from mixtures of an epoxy functionalized organosiloxane, an amino functionalized organosiloxane, a hydrophilic methacrylate monomer, and a curing catalyst. U.S. Pat. No. 5,270,080 to Mino et al. discloses anti-fogging compositions composed of silanol-functionalized fluoropolymers. European Patent Application Nos. 0 491 251 A1 and 0 492 575 A2 to Matsushita Electric Industrial Co. report water-repelling, oil-repelling anti-fogging films that are made from siloxy-functionalized hydrophobic compounds. These references report that plastic surfaces can be made reactive to hydroxyl groups or hydrophilic by corona treating the surface.

Other techniques have resulted in heterogeneous surfaces. U.S. Pat. No. 4,536,420 to Rickert discloses a water-wettable coating made from a mixture of colloidal acrylic resin and colloidal silica which, when cured, has a mud-cracked pattern, thus providing canals in the surface which tend to break up water droplets. Japanese Kokai Patent Publication 59-176,329 to Mitsubishi Monsanto Kasei Vinyl K.K. discloses transparent molded materials having patterned surfaces of hydrophilic and hydrophobic areas. In the examples, a patterned hydrophobic material is printed onto a hydrophilic film.

SUMMARY OF THE INVENTION

In a first embodiment, the present invention provides an article having a patterned surface in which the article comprises a polymer having inorganic oxide particles dispersed throughout the polymer. The patterned surface of this article has alternating regions of relatively high and low concentrations of inorganic oxide particles on the surface. The regions that have a relatively greater concentration of surface inorganic oxide particles are hydrophilic, while the regions that have relatively few or no inorganic oxide particles on the surface are hydrophobic. In another embodiment, the invention comprises alternating hydrophilic and hydrophobic surface regions where the hydrophilic surface region has inorganic oxide particles exposed to the atmosphere and the hydrophobic surface region is essentially without inorganic oxide particles. In yet another embodiment, the invention provides an article having dew and/or frost resistance in which the article has a patterned hydrophobic/hydrophilic surface in which the hydrophobic surface regions are sufficiently narrow to inhibit the growth of dew droplets and/or inhibit the formation of frost.

The invention further provides methods for making an article that has a patterned surface that contains hydrophobic and hydrophilic regions. In one method, a coating mixture of inorganic oxide particles in a polymer precursor composition is coated on a base film that has a grooved surface. The coating mixture is deposited only in the grooves and does not cover the entire surface. In a preferred embodiment, the entire surface is then treated with a treatment that removes polymer, such as a corona or oxygen plasma, to expose inorganic oxide particles, thus forming a hydrophilic/hydrophobic patterned surface in which the surface of the coating mixture is hydrophilic and the uncoated tops of grooves remain hydrophobic.

In another method, inorganic oxide particles are dispersed in a polymer matrix that is formed into an article, typically a sheet or coating. A mask such as a screen is then placed over the article such that the mask protects selected regions of the surface while unprotected regions of the surface are exposed to the treatment. The surface is then exposed to a treatment that selectively removes the polymer matrix to expose oxide particles in the unprotected region. The region that is protected by the screen maintains a hydrophobic polymer surface. Thus, this method produces a patterned surface that matches the pattern of the screen.

Various embodiments of methods and products of the invention offer numerous advantages and uses. In preferred embodiments, the inventive article is dew and/or frost resistant; this means that the articles decrease the tendency of dew or frost to form. For example, in preferred embodiments where the article is a coating, the coated substrate exhibits a decreased tendency to become fogged or frosted relative to the uncoated substrate. In dew conditions, moisture in air is attracted to the hydrophilic areas of the patterned surface while the hydrophobic areas stay clear of condensation. In frost conditions, the hydrophobic areas of the patterned surface may remain relatively frost free, thus permitting light transmission with decreased diffraction through the article, and tending to break up ice formation between hydrophilic regions. In frost conditions, where the inventive article is disposed over a retroreflective substrate, the hydrophilic areas may tend to become frosted over; however, the hydrophobic areas remain relatively frost free thus allowing incoming light to be retroreflected back to the source.

The inventive articles can also offer optical properties such as transparency, economy, abrasion resistance, and durability including resistance to water damage and fungus. Thus, the invention is advantageous when used on retroflective signs, retroreflectors in pavement markers, face plates such as in surgical or scuba masks, and windows. The articles can be lightweight and can protect an underlying substrate. Articles of the invention that utilize fluoropolymer matrices also can offer anti-graffiti properties, can be oil and stain resistant, and can be cleaned relatively easily and economically.

The methods of the invention allow the surface to be modified in a highly regular and controlled fashion and to be shaped or oriented in a manner desirable for a particular end use. Unlike conventional printing methods, the methods of the invention preferably utilize a patterned surface region that is only a few micrometers (em) in width. In preferred embodiments, the invention advantageously provides patterned films or coatings that are capable of being made in a single coating step from the same composition.

DETAILED DESCRIPTION

Figure 1:
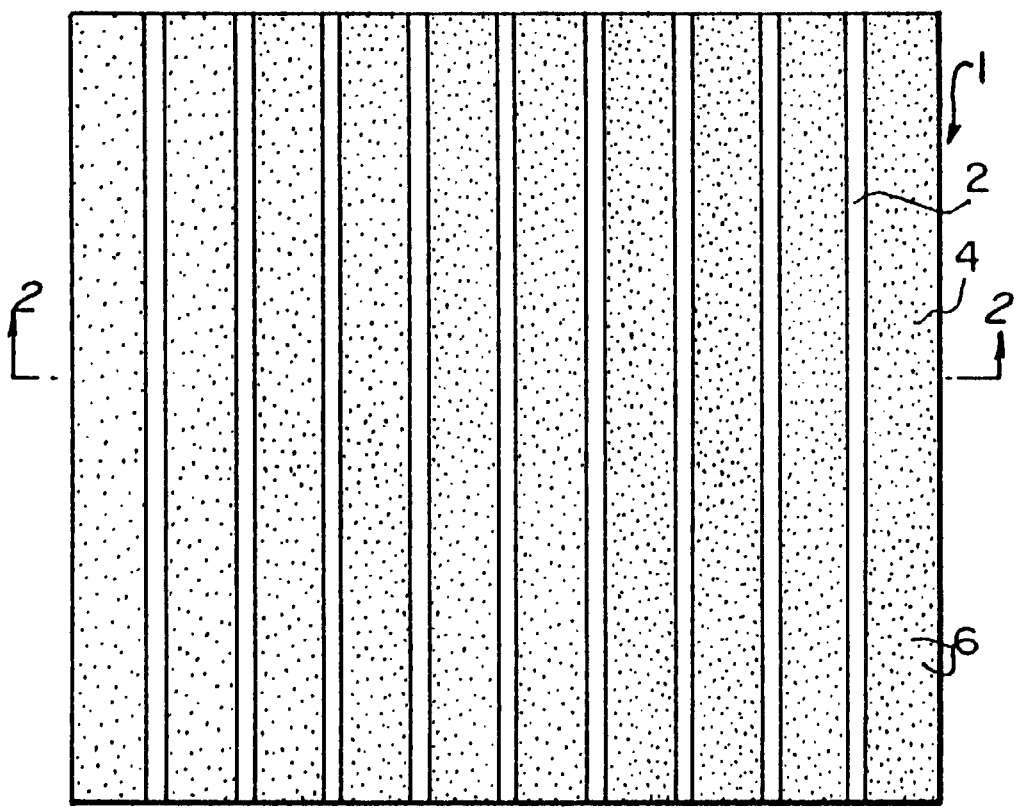
FIG. 1 is a top view of an article that has alternating hydrophilic (stippled) and hydrophobic (white) surface regions and that is formed from a grooved surface and having an inorganic oxide-containing polymer disposed in the recesses of the grooved surface.
Figure 2:
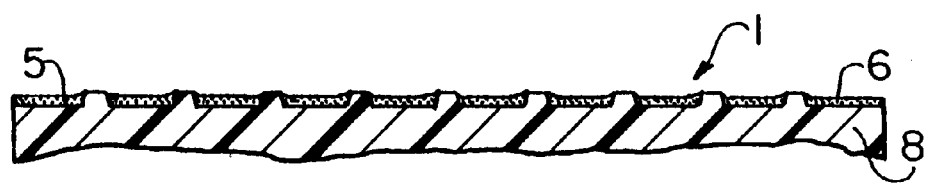
FIG. 2 is a cross-sectional view of the article of FIG. 1 taken along lines 2—2.
Figure 3:
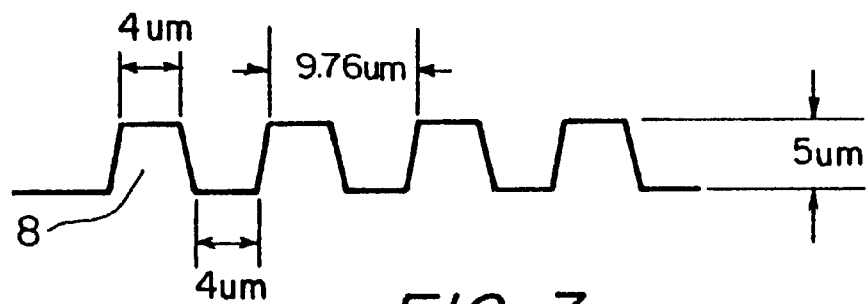
FIG. 3 is a schematic side view of a grooved hydrophobic film having a 4 μm (top)×4 μm (bottom)×5 μm (depth) square wave pattern.

The article 1 of FIG. 1 has alternating hydrophobic 2 and hydrophilic 4 surface regions. As shown in FIG. 2, the hydrophilic areas are made of a polymeric matrix 5 containing inorganic oxide particles 6. As shown in FIGS. 2 and 3, the polymeric matrix 5 containing inorganic oxide particles 6 is disposed in the recesses of a grooved hydrophobic polymer layer 8. The composition of the grooved hydrophobic polymer layer 8 can be the same or different as the polymeric matrix 5. Preferably, the grooved hydrophobic polymer layer 8 does not contain significant amounts of inorganic oxide particles. Unlike the hydrophilic regions, corona treatment of the hydrophobic polymer layer 8 does not result in a sufficient number of inorganic oxide particles at the surface to render the surface hydrophilic. Preferably the hydrophobic polymer contains less than 40 weight % inorganic oxide particles, more preferably less than 30 weight % inorganic oxide particles.

Figure 4:
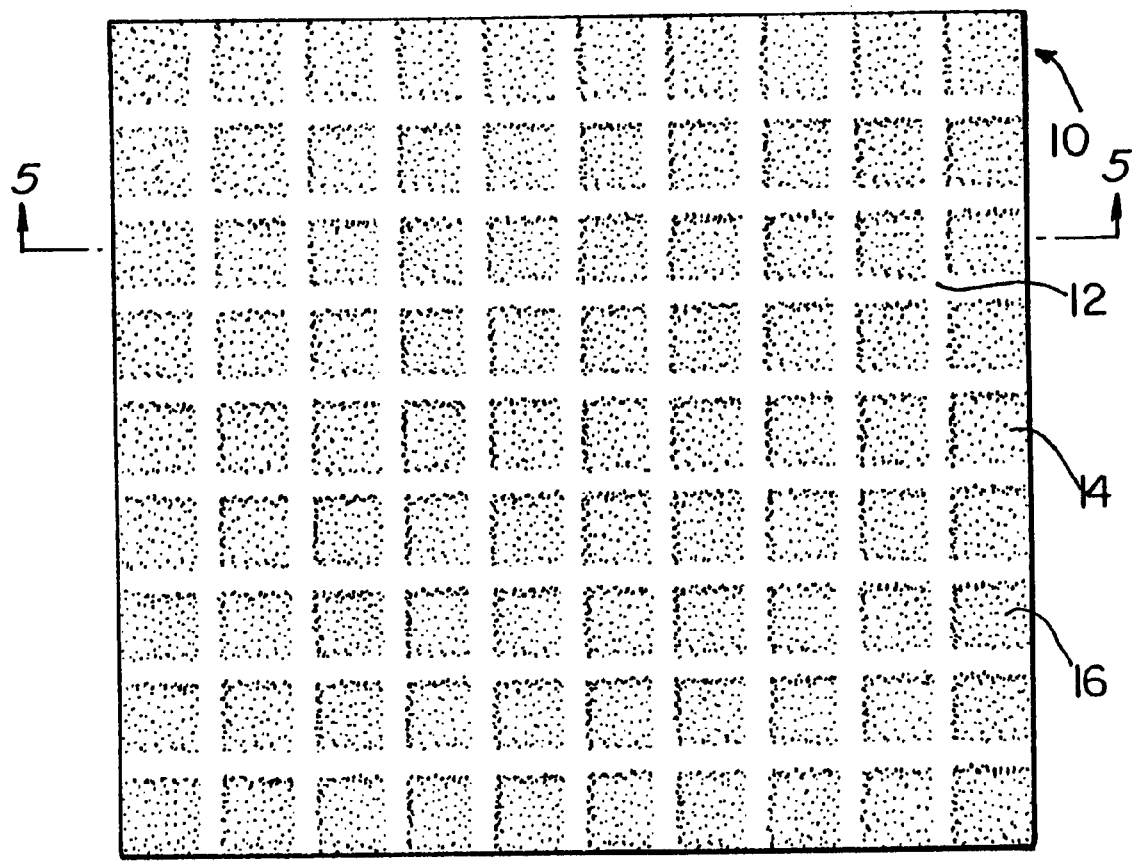
FIG. 4 is a top view of one embodiment of an article having alternating surface regions of hydrophilic (stippled) and hydrophobic (white) areas.
Figure 5:
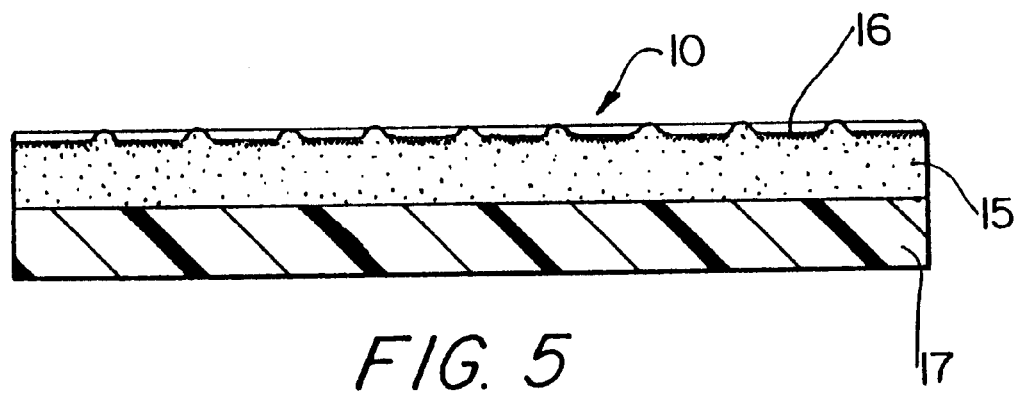
FIG. 5 is a cross-sectional view of the article taken along lines 5—5 of FIG. 4 having silica particles dispersed throughout the polymer matrix and having a higher concentration of silica particles in the hydrophilic surface regions.

The article 10 shown in FIGS. 4 and 5, has alternating hydrophobic 12 and hydrophilic 14 surface regions. In this embodiment the article is made of a polymeric matrix 15 containing inorganic oxide particles 16 (the "inorganic oxide-polymer composite"). As shown in FIG. 5, a coating may be disposed on a clear film substrate 17, typically a light transmissible substrate After the inorganic oxide-polymer composite material has been coated onto a substrate and cured, the surface of the composite is hydrophobic; however, removal of polymer from selected areas, for example, by a high energy treatment, creates a higher concentration of silica particles at the surface of the selected areas, and these selected areas become hydrophilic.

The polymeric materials used in the invention should be capable of transmitting light when the article is intended for use on an optical surface such as a retroreflective sheeting or a window. In a preferred embodiment, the polymeric materials are a fluoropolymer or polymeric blend containing a fluoropolymer. An advantage of fluoropolymer films is that they can be highly inert and can remain hydrophobic even after exposure to oxidizing treatments such as corona treatment and plasma oxidation. Fluoropolymers and acrylates are preferred in some embodiments because they tend to have good outdoor stability and are generally inert to microbial attack. Examples of preferred fluoropolymers include: transparent polyvinylidene fluoride (PVDF) and polymethyl methacrylate (PMMA) blended in a weight ratio between about 80:20 to 20:80, as described in U.S. Pat. No. 5,042,924; copolymers of PVDF with hexafluoropropylene (HFP); copolymers of PVDF with tetrafluoroethylene (TFE); copolymers of PVDF with chlorotrifluoroethylene (CTFE); and copolymers of TFE, HFP and vinylidene fluoride (VDF). Multilayer films containing fluoropolymer layers (preferably as a topmost, surface layer) with other transparent polymer layers are also useful. For example, organic polymer films such as PMMA, aliphatic polyurethane, or clear polyolefin copolymer may be combined with a fluoropolymer surface layer. Other, suitable transparent polymeric materials include acrylate polymers, such as PMMA, acrylic rubber modified PMMA, polyesters, polycarbonates, polyolefins and aliphatic polyurethanes.

The hydrophilic areas may include a silica-containing polymeric coating. (Suitable silica-containing polymers include those disclosed in U.S. Pat. Nos. 5,073,404; 4,844,976; 4,755,425; 4,885,332; 5,104,929; and 5,258,225). Polymeric materials for matrices 5 and 15 include aliphatic polyurethanes, polyacrylates, and polyvinylchloride polymers having a minor portion of a comonomer containing a carboxylic acid or hydroxyl moiety, and multifunctional acrylic polymers. In a preferred embodiment, the surfaces of silica particles are modified by reaction with multifunctional acrylic polymers.

The hydrophilic areas may also be made of silica-containing fluoropolymers. In this case, the fluoropolymer matrixes contain a moiety that enables the fluoropolymers to mix and form a composite with silica particles. Preferably, the fluoropolymers contain a moiety that is anionic in solution. Such polymers include those described, for example, in U.S. Pat. No. 5,382,564.

Examples of preferred silica-containing polymers are described in U.S. Pat. No. 5,608,003. Preferably, the uncured fluoropolymers contain at least one fluoroaliphatic moiety such as can be made by the addition polymerization of an ethylenically unsaturated monomer, such as perfluoroalkyl acrylate ester, e.g., $CH_2=CHCOOCH_2CH_2N(Et)SO_2C_8F_{17}$, or fluoroalkyl vinyl ethers, e.g., $CH_2=CHOCH_2C_7F_{15}$, or a combination thereof.

The mixtures for making the silica-containing fluoropolymers also preferably contain a water-soluble or water-dispersible oxazine or oxazoline polymer prepared by the addition polymerization of an oxazine- or oxazoline-containing ethylenically unsaturated monomer, such as 2-isopropenyl-2-oxazoline (IPO) and those represented by the general structures:

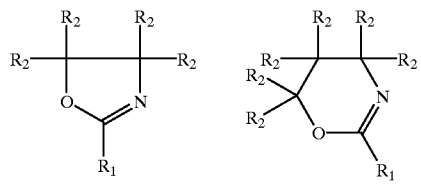

where $R^1$ represents an ethylenically unsaturated organic group having 2 to 10 carbon atoms and being capable of addition polymerization, such as an a–b ethylenically unsaturated group; and $R^2$ independently represents hydrogen, halogen, or a substituted organic radical having 1 to 6 carbon atoms. Preferably $R^2$ is hydrogen. Optionally an aliphatic or fluoroaliphatic radical-containing, ethylenically unsaturated monomer, such as acrylate esters, e.g., $CH_2=CHCO_2CH_2CH_2N(Et)SO_2C_8F_{17}$, vinyl ether, or styrenic monomers can be copolymerized with the oxazine- or oxazoline-containing ethylenically unsaturated monomer.

The inorganic oxide particles preferably are silica particles that are typically derived from colloidal silica dispersions. The silica particles can be pure silica or can be partly composed of other elements such as aluminum. Silica particles are preferred for a variety of reasons, including: excellent performance in water-spreading layers, low cost, hydrophilicity, UV light resistance, and compatibility with polymers. In preferred embodiments, the silica particles are impregnated with alumina or an aluminum salt for better weathering resistance. In some embodiments, metal oxide particles such as aluminum oxide, titanium oxide, or zirconium oxide can be used in place of silica particles. The inorganic particles provide abrasion resistance that is generally superior to other hydrophilic materials.

A wide variety of colloidal silica particles are usable in the silica-containing polymer layers of the invention. Many such colloidal silica dispersions are available commercially under such trade names as Ludo™ (available from E.I. Dupont de Nemours and Co., Inc., Wilmington, Del.), Nyacol™ (Nyacol Co., Ashland, Mass.), and Nalco™ (Nalco Chemical Co., Oak Brook, Ill.). Examples of silica sols that have been found useful include: Nalco™ 2327 and 2329, having silica particle sizes of about 20 and 75 nanometers (nm) respectively and a concentration in water of about 40 weight percent; Ludox™ AS-40, having a particle size of about 22 nm, an ammonia counterion and a concentration in water of about 40 weight percent. The silica particles preferably have an average particle diameter of 1 to 100 nm, more preferably 5 to 50 nm. Examples of other suitable colloidal silicas are described in U.S. Pat. No. 5,126,394.

Preferably, the silica particles are functionalized for better bonding to the polymeric matrix. Typically, silica particles are functionalized by adding a silylacrylate to aqueous colloidal silica. Examples of acrylate functionalized colloidal silica are described in U.S. Pat. Nos. 4,491,508; 4,455,205; 4,478,876; 4,486,504 and 5,258,225.

The colloidal silica particles are preferably employed in the silica-containing polymer layers at 30% to 90% by weight, more preferably 40% to 80% by weight, and still more preferably about 50% to 70% by weight.

In some embodiments the hydrophobic surface region is preferably essentially without silica or other inorganic oxide particles. In those embodiments the hydrophobic regions may contain small or incidental amounts of inorganic oxide particles but not enough to significantly affect the properties of the hydrophobic region. These hydrophobic regions preferably contain less than 5 weight% oxide particles, more preferably less than 3%.

Polymeric materials are known to degrade by a variety of mechanisms. Common additives that can offset this are known as stabilizers, absorbers, antioxidants, and the like. The coating compositions of the invention can also include one or more of the following: ultraviolet stabilizer, ultraviolet absorber, ozone stabilizer, and thermal stabilizer/antioxidant. The articles of the present invention are preferably essentially free of surface cracks.

Various additives may also be incorporated into the polymeric compositions that are used in the invention. These include surfactants, coupling agents, curing agents such as thermal or photoinitiators, etc. Preferred surfactants include Fluorad™ brand anionic fluorochemical surfactants (potassium perfluoroalkyl sulfonates) available from 3M Corporation, St. Paul, Minn. Other functional groups can optionally be incorporated into the surfactant or cross-linking polymer components, such as polymerizable UV absorbers, e.g., Norbloc™ 7966 (2-(2'-hydroxy-5-methacrylyloxyethylphenyl)-2H-benzotriazole), available from Noramco Inc, New Brunswick, N.J. Surfactant polymer component, crosslinking polymer component, and silica hydrosol can be combined in any order and manner of combination by direct mixing using any conventional means such as mechanical agitation, ultrasonic agitation, stirring, and the like. For example, silica hydrosol can be added to the combined polymer formulation, that is, the mixture of the surfactant polymer component and the crosslinking polymer component. Or it may be added to either the surfactant polymer component or the crosslinking polymer component before making the combined formation. Preferably, the crosslinking component and/or the surfactant component are added to the silica hydrosol while maintaining the pH of the mixture at values greater than 8 to avoid precipitation of one or more of the components.

Suitable UV absorbers include benzotriazoles, benzophenones, oxanilides, and aryl benzoates. One suitable UV light absorber is Uvinul™ N-539 (2-ethylhexyl-2-cyano-3,3-diphenylacrylate) available from BASF, Parsippany, N.J. In addition to UV absorbers, suitable UV stabilizers include hindered amines and phenolic antioxidants. Suitable UV absorbers and stabilizers include Tinuvin™ 292, 328 and 1130 available from Ciba-Geigy Corp. of Ardsley, N.Y. UV absorbers and stabilizers can improve weatherability and reduce yellowing of the coating. Preferably, the ultraviolet stabilizer or absorber is present in an amount up to about 10% by weight, and more preferably about 1–5%, based on the total weight of the coating precursor composition without solvent. Different ultraviolet stabilizers and absorbers can be used if desired.

Preferred coupling agents are silane coupling agents. Examples of silane coupling agents include methacryloxy, aminoepoxy, or mercapto-functional silanes (or siloxanes) and the coupling agents described in U.S. Pat. No. 5,258,225.

An example of a preferred free radical thermal initiator includes VAZO-64, available from DuPont, Wilmington, Del.

Examples of photoinitiators that generate a free radical source when exposed to visible light radiation include, but are not limited to, benzophenones. Examples of photoinitiators that generate a free radical source when exposed to ultraviolet light include, but are not limited to, organic peroxides, azo compounds, quinones, benzophenones, nitroso compounds, acryl halides, hydrozones, mercapto compounds, pyrylium compounds, tracrylimidazoles, bisimidazoles, chloroalkyltriazines, benzoin, benzoin methyl ether, benzoin ethyl ether, benzoin isopropyl ether, benzoin isobutyl ethers and methylbenzoin, diketones such as benzil and diacetyl, phenones such as acetophenone, 2,2,2-tri-bromo-1-phenylethanone, 2,2-diethoxyacetophenone, 2,2-dimethoxy-2-phenylacetophenone, 2,2,2,-tribromo-1(2-nitrophenyl) ethanone, benzophenone, and 4,4-bis(dimethyamino) benzophenone. Examples of commercially available ultraviolet photoinitiators include, but are not limited to, those available under the trade designations Irgacure™ 184 (1-hydroxycyclohexyl phenyl ketone), Irgacure™ 369 (2-benzyl-2-N,N-dimethylamino-1-(4-morpholinophenyl)-1-butanone),and Darocur™ 1173 (2-hydroxy-2-methyl-1-phenyl-propan-1-one) from Ciba-Geigy. Typically, if used, an amount of an initiator is included in the precursor composition to effect the desired level and rate of cure. Preferably, the initiator is used in an amount of about 0.1–10%, and more preferably about 2–4% by weight, based on the total weight of the coating precursor composition without solvent. Different initiators also can be used if desired.

In addition to an initiator, the coating composition of the invention can include a photosensitizer. The photosensitizer aids in forming free radicals that initiate curing of the composition, especially in an air atmosphere. Suitable photosensitizers include, but are not limited to, aromatic ketones and tertiary amines. Suitable aromatic ketones include, but are not limited to, benzophenone, acetophenone, benzil, benzaldehyde, and o-chlorobenzaldehyde, xanthone, tioxanthone, 9,10-anthraquinone, and many other aromatic ketones. Suitable tertiary amines include, but are not limited to, methyldiethanolamine, ethyldiethanolamine, triethanolamine, phenylmethylethanolamine, dimethylaminoethylbenzoate, and the like. Typically, if used, an amount of initiator is included in the precursor compositions to effect the desired level and rate of cure. Preferably, the amount of photosensitizer used in the compositions of the invention is about 0.01–10%, more preferably about 0.05–5%, and most preferably about 0.25–3% by weight, based on the total weight of the coating composition without solvent. Different photosensitizers can be used if desired.

An ozone stabilizer may also be added to the polymeric material. Examples of ozone stabilizers include, but are not limited to, hindered amines such as Irgonox™ 1010 available from Ciba-Geigy and phenoltriazine commercially available from Aldrich. The coating composition can include an amount of an ozone stabilizer to impart the desired result. Preferably, the ozone stabilizer is present in an amount up to about 1% by weight, more preferably about 0.1–1.0%, and most preferably about 0.3–0.5%, based on the total weight of the coating precursor composition without solvent. Different ozone stabilizers can be used if desired.

A thermal stabilizer/antioxidant can also be added to the polymeric material to reduce the amount of yellowing as a result of weathering. Examples of such materials include, but are not limited to, low melting hindered phenols and triesters. Specific examples include 2,6-di-tert-butyl-4-methylphenol commercially available under the trade designation Ultranox™ 226 antioxidant from Borg Warner Chemicals, Inc., Parkersburg, N.Y.; octadecyl 3,5-di-tert-butyl-4-hydroxycinnamate commercially available under the trade designations Isonox™ 132 antioxidant (Schenectady Chemicals, Inc., Schenectady, N.Y.) or Vanox™ 1320 antioxidant (Vanderbilt Co., Inc., Norwalk, Conn.). The coating precursor composition can include an amount of the thermal stabilizer/antioxidant to impart the desired result. Preferably, the thermal stabilizer/antioxidant is present in an amount up to about 3% by weight, and more preferably about 0.5–1%, based on the total weight of the coating precursor composition without solvent. Different thermal stabilizers/antioxidants can be used if desired.

The grooved hydrophobic patterned film, an example of which is shown in FIG. 3, preferably has a square wave pattern with about 1 to 20 $\mu$m of flat bottom, about 1 to 20 $\mu$m of flat top and about 1 to 10 $\mu$m of depth, and more preferably about 2 to 10 $\mu$m of flat bottom, about 2 to 10 $\mu$m of flat top and about 2 to 59 $\mu$m of depth. In addition to linear trenches, possible patterns include circles, triangles, squares, irregular shapes, etc. For the best effects of dew and frost prevention, the top surfaces and the recessed regions should have a maximum width of less than 20 $\mu$m, more preferably less than 10 $\mu$m. It is believed that the narrow widths are more effective because water droplets that may begin to form on the hydrophobic areas come into contact with adjacent hydrophilic areas and are spread into a thin film.

The invention is typically disposed over a substrate. The inventive coating would typically be applied onto glass or plastic. Preferred substrates include retroreflective sheetings, traffic markers, windows (e.g., greenhouse, building, freezer door, automobile window, etc.), mirrors, surgical goggles, and scuba masks. Examples of retroreflective substrates include Scotchlite Diamond Grade LDP 3970 and VIP 3990, and High Intensity Sheeting 3870 (all available from 3M, St. Paul, Minn.). In some embodiments, an adhesive layer is used to improve adhesion of the coating to the substrate. In another preferred embodiment, a sheet of the invention carries a layer of a pressure sensitive adhesive (e.g., Scotch Tape 9172 MP, available from 3M, St. Paul, Minn.) and a release lining is placed over the pressure sensitive adhesive. In this fashion, a sheet of the invention may be stored for subsequent applications to a substrate.

A microstructured film surface can be molded to have shapes such as grooves, circles, triangles, squares, irregular shapes, etc. Preferably, the surface has square wave grooves such as those shown in FIGS. 1–3. In this preferred embodiment, capillary forces can reduce water droplet formation; however, the grooved surface diffracts light, reducing transparency and thus significantly reducing the intensity of light retroreflected from an underlying retroreflective substrate. The light transparency is significantly improved by filling the grooves with an inorganic oxide-polymer composite. Preferably, the refractive index of the inorganic oxide-polymer composite matches that of the substrate. Thus a silica-fluoropolymer composite is preferably used on a low refractive index grooved substrate such as a fluoropolymer film. The depth of the filled grooves from the substrate's top flat surface is preferably less than 1 $\mu$m, more preferably less than 0.5 $\mu$m, and still more preferably less than 0.25 $\mu$m.

An important aspect of the invention is the hydrophobic/hydrophilic nature of the patterned surface. Preferably the hydrophilic areas have a static contact angle, as measured on a 0.01 milliliter (ml) water droplet at room temperature, of less than 30°, more preferably less than 20°, and most preferably less than 15°. Preferably the hydrophobic areas have a static contact angle of more than 40°, more preferably more than 50°, and more preferably more than 60°.

When the patterned coatings are disposed on a retroreflective substrate, the retroreflected intensity of visible light of a coated retroreflective substrate preferably is at least 50% of the retroreflective intensity of the uncoated substrate, more preferably at least 70%, and still more preferably at least 80%. The patterned article preferably has a transparency to visible light of at least 90%.

Coatings having inorganic particles dispersed in a polymeric material or a polymer precursor can be applied to a substrate by techniques such as spray coating, knife coating, dip coating, flow coating, bar coating, roll coating, and the like. In some embodiments, a polymeric material can be dispersed in an organic solvent prior to the coating application.

The coating compositions of the invention can be applied to a substrate in essentially any desired thickness. It has been found that coatings as thin as a few microns offer excellent abrasion resistance and low surface energy. However, thicker coatings (e.g., up to about 20 $\mu$m or more) can be obtained by applying a single thicker coating or by applying successive layers of the coating to the substrate. The latter can be done by applying a layer of the coating composition to the substrate and then drying without extensive curing, for example, by heating the coated substrate for about one minute at about 75° C. Successive layers of the coating can then be applied to dried, but uncured, coatings. This procedure can be repeated until the desired coating thickness is obtained.

One preferred embodiment uses a hydrophobic, grooved polymer having elevated surfaces (e.g., the top of a square wave) alternating with recessed grooves. Grooved polymers, including grooved polymer films, can be made by replication from tooling with the inverse of the desired pattern by pressing a polymer or polymer precursor in a copper or nickel mold. The grooved polymer films (prior to filling the grooves) have a relatively low light transmittance, typically less than 85%.

The grooved polymer is preferably coated by roll coating to fill the grooves with the silica-containing polymer; thus leaving the top surfaces (i.e., the surfaces outside the grooves) uncoated. Alternatively, excess silica-containing polymer may be scraped off the surfaces between the recessed grooves. Preferably, the coating composition exhibits minimal shrinkage (if any) during drying and curing to result in completely filled grooves. Preferably the coating composition is solvent-free.

After the film-forming or coating process, the silica-containing polymer is then typically thermally or photochemically cured. At this stage of the process, the surfaces of the coatings or films are typically hydrophobic. The coating composition is preferably cured at elevated or room temperatures, e.g., from about 20 to about 125° C. The use of elevated temperatures, e.g., 50° C. to 125° C., results in faster cure and is preferred.

A major surface of the article is then treated to convert portions of that surface to a hydrophilic surface. There are a variety of ways in which this can be accomplished. The exposed major surface may be corona treated, oxygen plasma treated (see for example, U.S. Pat. No. 4,772,488 incorporated herein by reference), chemically treated such as with a chemical etchant or ozone treated. When using corona treatment, the energy level typically is at least 1 joule/cm$^2$ (j/cm$^2$), preferably about 2–20 j/cm$^2$. The corona treatment exposes the silica particles 6 in layer 5 to produce hydrophilic regions while polymer 8, which does not contain silica particles, remains hydrophobic. The type of surface treatment is described or detail in U.S. patent application Ser. No. 08/663,965 filed Jun. 14, 1996, entitled Polymeric Article Having Improved Hydrophilizing and Method of Making Same.

For articles, such as sheetings or coatings, in which the entire matrix is composed of an inorganic oxide particle-containing polymer, patterning can be obtained by screening off selected portions of a polymer surface. In a preferred embodiment, a dielectric screen is placed between the energy source for corona treatment and the surface of the article. The opened areas of the mask allow the corona or plasma arc to blast off the topmost layer of the organic polymer binder to expose the inorganic oxide particles. The regions protected by the mask remain hydrophobic. In this embodiment, the hydrophobic surface regions (i.e., shaded regions) preferably have widths of between about 1 and 10 $\mu$m and more preferably less than 5 $\mu$m. The hydrophilic regions (i.e., the exposed regions) preferably have widths of less than 10 $\mu$m.

Advantages and other details of this invention are further illustrated in the following examples, but the particular materials and amounts recited in the examples, as well as other conditions and details, should not be construed to unduly limit this invention. In the examples, all temperatures are in degrees Centigrade and all parts and percentages are by weight unless indicated otherwise.

EXAMPLES

Abbreviations

The following abbreviations are used in the Examples:

| | |
|---|---|
| FX-13 ™ | 2-(N-ethylperfluorooctane sulfonamido)ethyl acrylate, available from 3M, St. Paul, MN |
| CX-WS-300 ™ | isopropenyl oxazoline/ethyl acrylate/methyl methacrylate terpolymer (85/5/10 weight %), available from Nippon Shokubai Co., Ltd. |
| Ludox ™ AS-40 | colloidal silica hydrosol, 22 nm average diameter, available from DuPont, Wilmington, DE |
| MPTS | mercaptopropyl trimethoxysilane available from Aldrich Chemical Co. |
| IPO | 2-isopropenyl-2-oxazoline |
| Zonyl ™ -TM | $CH_2=C(CH_3)CO_2CH_2CH_2C_8F_{17}$ available from DuPont, Wilmington, DE |
| MeFOSEA | 2-(N-methylperfluorooctane sulfonamido)ethyl acrylate, available from 3M, St. Paul, MN |
| MAA | methacrylic acid, available from Aldrich Chemical Co., Milwaukee, WI |
| LUDOX ™ TM-50 | colloidal silica hydrosol, 22 nm average diameter, available from DuPont, Wilmington, DE |
| LUDOX ™ TM-30 | colloidal silica hydrosol, 7 nm average diameter, available from DuPont, Wilmington, DE |
| FC-405 | $C_8F_{17}SO_2N(C_2H_5)(CH_2)_3Si(OCH_3)_3$ available from 3M, St. Paul, MN |
| BuFOSEA | $C_8F_{17}SO_2N(C_4H_9)CH_2CH_2OCOCH=CH_2$ available from 3M, St. Paul, MN |
| FOMA | $C_7F_{17}CH_2OCOC(CH_3)=CH_2$ available from 3M, St. Paul, MN |
| Darocure ™ -1173 | 2-hydroxy-2-methyl-1-phenyl-propan-1-one, available from Ciba-Geigy, Tarrytown, NY |
| LDP-3970 | Scotchlite LDP Diamond Grade Reflective Sheeting ™ No. 3970, available from 3M, St. Paul, MN |
| VIP-3990 | Scotchlite VIP Diamond Grade Reflective Sheeting ™ No. 3990, available from 3M, St. Paul, MN |
| PMMA | Polymethyl methacrylate, available from Rohm-Haas Co., Philadelphia, PA |
| PVDF | Polyvinylidene fluoride, available from Solvay and Cie, Brussels, Belgium |
| Norblock ™ 7966 | 2-(2'-hydroxy-5-methacrylyloxyethylphenyl)-2H-benzotriazole, available from Noramco Inc., New Brunswick, NJ |
| XL-29SE | Crosslinker, available from Union Carbide, Danbury, CT |
| Silane A-174 | gamma-methacryloxy-propyl-trimethoxysilane, available from Union Carbide, Danbury, CT |

Wettability and Abrasion Resistance of Silica-Containing Fluoropolymers

In the following examples and comparative examples, the precursor polymers such as for example the surfactant component polymer and the crosslinking component polymer were prepared essentially as described in U.S. Pat. Nos. 5,382,639, 5,294,662, 5,006,624, and 4,764,564. The coating compositions were prepared, applied to a polyethylene terephthalate film substrate, cured, and evaluated for low surface energy properties and abrasion resistance performance.

The "pen test" described in U.S. Pat. No. 5,294,662 was used. The test involved drawing a fine line on a coated film using a black Sharpie™ fine point permanent marker available from the Sanford Company. A number value of 0 to 3 was assigned based on the appearance of the resulting line. The values were defined as follows: 3: totally unwettable, ink dewets to form a discontinuous line; 2: ink partially dewets to form a very thin continuous line; 1: some dewetting; 0: totally wettable, same as non-treated surface. For illustration of the method, a line written on a polytetrafluoroethylene surface dewets slightly and is assigned a 1.

The abrasion resistance of the coatings was determined by measuring the resulting % haze of a film sample using ASTM D-1044-90 on a Teledyne Tabor Abraser with a 500 g load and a pair of CS-10F Calibrase™. The less haze resulting from the abrasion, the higher the abrasion resistance of the coating.

The resulting coatings were also tested for static water contact angle using a 0.01 ml droplet by essentially the method described by Zisman, W. A., in "Contact Angle, Wettability, and Adhesion," Advances in Chemistry, Series 43, American Chemical Society, Washington, D.C. (1964). An ESCA test comprised evaluating the samples for surface fluorine content using a ¼ inch by ¼ inch portion of the coated sample using a Fison F Inspector™ ESCA analyzer. The sample was scanned from 0 electron volts to 1100 electron volts, and the results were averaged for four scans.

To a 5 liter 3-necked flask equipped with a mechanical stirrer, a cooling condenser, and a temperature control device was added FX-13™ acrylate (600 g), 2-carboxyethyl acrylate (400 g), azo bis-isobutyronitrile (AIBN, 6.0 g), N-methylpyrrolidinone (400 g), and isopropanol (600 g). The solution was purged with nitrogen for about 3 min. and heated to initiate polymerization. As the reaction became exothermic the temperature control was adjusted to 70° C. and heating continued at that temperature for about 2.5 hours. The cooling condenser was replaced by a distillation condenser, and isopropanol was distilled from the reaction mixture. The resulting polymer was neutralized by addition to aqueous ammonia and water until the solution was basic (pH=7.5–8.5).

To 30 g of the above acrylate copolymer solution (8.1 g solids, 22.5 mmols of carboxylic groups) was added an aqueous solution of CX-WS-300™ terpolymer (3.2 g solids, 24.8 mmols of oxazoline groups), followed by 2.5 g of N-methyl pyrrolidinone. The pH of the resulting solution was adjusted to 7.5–8 by adding aqueous ammonia. This formulation is hereinafter referred to as "WXF Formulation" (Waterbone Crosslinkable Fluorochemical coating system).

To Ludox™ AS-40 hydrosol (40 g solids) was added concentrated aqueous ammonia (about 0.5 g), water (80 g), N-methylpyrrolidinone (26 g), and CX-WS-300™ terpolymer (5.2 g solids) with stirring. A translucent solution (17.5% solids) was obtained.

To the CX-WS-300™ crosslinker/$SiO_2$ solution described above (1.75 g solids, 1.55 g $SiO_2$) was added under vigorous stirring a solution of "WXF Formulation" (1.75 g solids) to produce a translucent formulation (17.5% solids, 44% $SiO_2$ by solids).

This formulation was allowed to sit at room temperature for about 1–2 days after which it was then coated onto a polyethylene terephthalate film with a #30 Meyer rod to a coating thickness of about 10–12 microns. The resulting coating was then heated in a oven at 120° C. for 30 min. The finished film was transparent and resistant to solvents and water.

The fluorine percentage of this composition was calculated as 11% from the known fluorine content of the monomers. The resulting film was evaluated using the described "pen test". The results are shown in Table 1.

All of the Examples in Table 1 were coated, cured, and evaluated essentially as described above.

Examples 2–7 were prepared analogously to Example 1.

Examples 8–10

To a 500 ML 3-necked flask equipped with a mechanical stirrer, a condenser, and a temperature control device was added Zonyl™ acrylate (54 g), 2-carboxyethyl acrylate (36 g), AIBN (0.54 g), mercaptopropyltrimethoxysiliane (1.8 g), N-methylpyrrolidinone (45 g), and isopropanol (45 g). The resulting solution was purged with nitrogen and heated to initiate polymerization. As the reaction became exothermic the temperature control was adjusted to 70° C. and heating continued at that temperature for about 3.5 hours. Isopropanol was removed under reduced pressure, and the resulting polymer was neutralized by addition of aqueous ammonia until the solution was basic. Part of this solution (12.9 solids, 35 mmoles of carboxylic groups) was further mixed with CS-WS-300™ (4.6 g solids, 35 mmoles of oxazoline group) to produce a clear coating formulation.

To Ludox™ AS-40 hydrosol, (2 g solids) was added 3 drops of concentrated ammonia, 5 g of water, the clear coating formulation described above (5.7 g solids), and CX-WS-300™ (0.26 g solids) with stirring to produce a silica-containing formulation (16.5% solids, 25% $SiO_2$ by solids). Examples 9 and 10 were prepared analogously to Example 8.

Example 11

A sample of Ludox™ TM-50 (12 g solids) was diluted with water to 60 g total, followed by addition of concentrated ammonia to adjust the pH to about 9. To "WXF Formulation" containing 2% MPTS (34.4 g solids) was added CX-WS-300™ terpolymer (1.6 g solids), followed by N-methylpyrrolidinone (1.7 g), and water (6.0 g). The two solutions were then combined to produce a final coating formulation with 25% $SiO_2$.

Examples 12–14 were prepared using the materials and essentially the procedures described in Example 11, but the type of colloidal silica was varied as shown in Table 1.

Examples 15 and 16

Using a procedure analogous to Example 1, a fluoropolymer composition was prepared by mixing 39 wt% MeFOSEMA, 5 wt% Norblock™ 7966, 5 wt % silane A-174, 22 wt % acrylic acid, 4 wt % mercaptopropionic acid ($HSCH_2CH_2CO_2H$), and 25% methylmethacrylate. This fluoropolymer dispersion was blended with CX-WS-300 terpolymer at a 1.0:09 molar ratio of carboxylic group: isopropenyl group of the resulting formulation was further mixed with colloidal silica (Nalco 2329) according to the method of Example 1, coated on a PET film, dried, and cured at 120° C. for 5 minutes.

The resulting cured films were passed twice through a corona treater (model EGR-48C, from ENI Power Systems, Inc. Rochester, N.Y.), at an energy level of 7.75 j/cm$^2$ in air. Static water contact angles for Examples 15 and 16 are shown below:

| | | Water Contact Angle (°) | |
|---|---|---|---|
| Example | Colloidal Silica Content (wt %) | Before Corona Treatment | After Corona Treatment |
| 15 | 25 | 104 | 37 |
| 16 | 45 | 111 | 27 |

TABLE 1

Examples of Fluoropolymer Films

| Example | Wt. % F | Wt. % $SiO_2$ | Haze %, 200 Cycles | Coating Components | ESCA* C/F/Si (%) | Pen Test | Water Contact Angle (°) |
|---|---|---|---|---|---|---|---|
| 1 | 11.1 | 44 | 5.9 | WXF Formulation + $SiO_2$ | 39/21/7.8 | 0 | 136 |
| 2 | 14.2 | 32 | 9.8 | WXF Formulation + $SiO_2$ | 46/26/1.8 | 3 | 102 |
| 3 | 17.6 | 18.4 | 13 | WXF Formulation + $SiO_2$ | 46/28/0.6 | 3 | 104 |
| 4 | 10.5 | 44 | 8.6 | WXF/2% MPTS + $SiO_2$ | 43/25/4.0 | 1 | 119 |
| 5 | 14.0 | 32 | 10 | WXF/2% MPTS + $SiO_2$ | 44/28/1.8 | 3 | 106 |
| 6 | 17.5 | 18.4 | 13 | WXF/2% MPTS + $SiO_2$ | 47/27/0.7 | 3 | 104 |
| 7 | 18.4 | 25 | 10 | WXF/FX-13/IPO (20/80) + $SiO_2$ | 46/26/1.5 | 3 | 100 |
| 8 | 19.3 | 25 | 10 | WXF/2% MPTS & Zonyl Acrylate + $SiO_2$ | 46/32/1.1 | 3 | 110 |
| 9 | 13.1 | 25 | 7.0 | WXF/MeFOSEA + $SiO_2$ | 46/32/1.1 | 3 | 102 |
| 10 | 16.2 | 25.5 | 9.2 | WSF/MAA + $SiO_2$ | 46/31/0.7 | 3 | 106 |
| 11 | 15.6 | 25 | 11.4 | Ludox ™ TM-50 | 46/26/1.0 | 3 | 102 |
| 12 | 17.2 | 18.4 | 11.6 | Ludox ™ TM-30 | 45/26/1.9 | 1 | 108 |
| 13 | 16.7 | 25 | 7.3 | Nalco ™ 2329 hydrosol, particle size: 75 mm | 50/25/0 | 3 | 106 |
| 14 | 13.3 | 40 | 4.2 | Nalcol ™ 2329 hydrosol | 49/27/0.8 | 3 | 105 |

*Electron Spectroscopy for Chemical Analysis

The ESCA analyses show that the surface of the coatings has much higher fluorine content and much lower silica content than would be expected when compared to the bulk calculated values.

Water-Spreading of Silica-Containing Fluoropolymers Before and After Corona Treatment Water droplet behavior was examined in the following experiment. Half of the surface of a fluoropolymer coating was treated with a corona at an energy level of 14.8 j/cm$^2$. A water droplet on the untreated area remained in a bead. A water droplet placed on the boundary between the treated and untreated areas migrated to the treated area and spread out over the surface.

Examples 17–22

Examples 17–21 were prepared by combining a ceramer precursor composition ("ceramer") with a fluorosilane or an acrylate-functionalized fluorochemical. The ceramer contained 45.6 wt % colloidal silica particles Nalco™ 1034A (Nalco™ Co. CAS 7631-86-9), 27.2 wt % hydroxyethylacrylate, 11.3 wt % gamma-methylacryloxypropyl trimethoxysilane, and 15.9 wt % pentaerythritol triacrylate (see U.S. Pat. Nos. 4,885,332 and 5,104,929). Example 17 was prepared from 97.0 wt % ceramer with 0.5 wt % FOMA. Example 18 was prepared from 96.5 wt % ceramer with 1.0 wt % FOMA. Examples 19 and 20 were prepared from 97.0 wt % ceramer with 0.5 wt % BuFOSEA and 0.5 wt % FC-405, respectively.

Example 21 was prepared from 96.5 wt % ceramer with 1.0 wt % FC-405. Example 22 contained 97.5 wt % ceramer. Examples 17–22 all contained 2.5 wt % of the photoinitiator Darocure™ 1173 and contained between 44.0 and 44.5 wt % $SiO_2$.

Each composition was coated onto a substrate film via a Myer wire coating having a wet coating thickness of 32 μm and cured by UV radiation from a medium intensity mercury lamp.

In the case of coating Examples 18 and 19, fluorochemical FC-405 was first dissolved in a minimal amount of acetone before blending with the ceramer for better mixing. Typically, one gram of FC-405 was mixed with 10 gram of acetone organic solvent. The coating mixture was coated out on a reflective sheeting, as described above, and the wet film was first heated in an oven at 80° C. for 3 minutes prior to the UV radiation cure.

The coatings were treated with two passes of a high-energy corona at an energy level of 5.6 j/cm². Retroreflectivity was measured after corona treatment at an entrance angle of –4° and an observation angle of 0.2°. The results are shown in Table II.

TABLE II

Water Contact Angle of Silica-Containing Polymer Before and After Corona Treatment

| | $SiO_2$ Content (wt %) | Substrate Type of DGS | Retro-reflectivity (cd/lux/m²) | Retro-reflectivity Retention (%) | Water Contact Angle (°) Before Corona | After Corona |
|---|---|---|---|---|---|---|
| Substrate-LDP | 0 | LDP-3970 | 1155 | 100 | 75 | — |
| Example 17 | 44.2 | LDP-3970 | 579 | 50.1 | 59 | 9 |
| Example 18 | 44.0 | LDP-3970 | 755 | 65.4 | 57 | 9 |
| Example 19 | 44.2 | LDP-3970 | 531 | 46.0 | 69 | 8 |
| Example 20 | 44.2 | LDP-3970 | 450 | 39.0 | 105 | — |
| Example 21 | 44.0 | LDP-3970 | 357 | 30.9 | 98 | 12 |
| Substrate-VIP | 0 | VIP-3990 | 532 | 100 | 79 | |
| Example 22 | 44.5 | VIP-3990 | 555 | 104 | 51 | |

Grooved and Patterned Films

Grooved films were made by stamping PMMA or a PMMA/PVDF (40/60 wt %) blend. Examples of making grooved films are described in U.S. Pat. Nos. 4,260,220 and 4,906,070. The copper tooling for stamping the square wave grooved films of the invention was made by diamond turning using a precision lathe. A 75 μm thick film was placed on top of a copper mold and pressed at an embossing temperature of about 205° C. and a pressure between 200 psi (1.4 MPa) and 1000 psi (7 MPa). After cooling the press, the grooved film was removed from the mold. The films were made with a square-wave pattern (dimensions in μm: top width×bottom width×depth) or with a v-cut. The films were laminated via a clear acrylic pressure sensitive adhesive (Scotch™ Tape 9172 MP) onto retroreflective sheeting LDP-3970 or VIP-3990. Retroreflectivity of these films was measured at an entrance angle of –4° and an observation angle of 0.2° (see ASTM E810-936). Retroreflectivity of these films is shown in Table III.

A colloidal silica containing polymer composition was formulated as described in U.S. Pat. Nos. 4,844,976 and 5,073,404 from a combination of a water borne acrylic polymer (NeoCryl A-614, 33 wt. %), a water borne aliphatic polyurethane (NeoRez R-960, 6%), gamma-glycidoxypropyltrimethoxysilane (3%), sodium aluminate (2%), crosslinker XL-25SE (2%), a UV absorber (Tinuvin™ 1130, 2%), a UV light stabilizer (Tinuvin™ 292, 1%), and an aqueous dispersion of colloidal silica (Nalco™ 1140, 51%). The silica-containing polymer composition was pressed into the grooves of the grooved film with a smooth round rod and excess polymer was scraped off the surface of the film. The coating was dried and cured at 82° C. for 5 minutes. Multiple coating passes can be used to more completely fill the grooves. Retroreflectivity of the coated films was measured under the same conditions as before coating.

TABLE III

Retroreflectivity of Grooved and Patterned Films

| Samples: | Grooved Film Material | Micro-structure Type | Retroreflectivity (cd/lux/m²) Before Coating | 2 Coats | 3 Coats |
|---|---|---|---|---|---|
| VIP-3390 Standard | None | None | 529 | | |
| Square-Wave | PVDF/PMMA (60/40) | Pattern-4-12-4 | 145 | | |
| Square-Wave | PVDF/PMMA (60/40) | Pattern-4-1.5-4 | 24 | | |
| Square-Wave | PVDF/PMMA (60/40) | Pattern-4-8-3 | 96 | | |
| Square-Wave | PVDF/PMMA (60/40) | Pattern-4-4-5 | 57 | | |
| Square-Wave | PVDF/PMMA (60/40) | Pattern-2-8-5 | 40 | | |
| Square-Wave | PVDF/PMMA (60/40) | Pattern-2-8-3 | 39 | | |
| Square-Wave | PMMA | Pattern-4-12-4 | 136 | 101 | 283 |
| Square-Wave | PMMA | Pattern-4-8-3 | 93 | | |
| V-shape | PMMA | 1 um pitch | 260 | | |
| Square-Wave | PMMA | Pattern-4-1.5-4 | 23 | 343 | 430 |
| Square-Wave | PMMA | Pattern-4-8-3 | 93 | | |
| Square-Wave | PMMA | Pattern-4-4-5 | 58 | 235 | 483 |
| Square-Wave | PMMA | Pattern-2-8-5 | 49 | 165 | 491 |
| Square-Wave | PMMA | Pattern-2-8-3 | 46 | 250 | 501 |
| Square-Wave | PMMA | Pattern-2-4-3 | 36 | | |

TABLE IV

Micro-Groove Film Retroreflectivity and Surface Characteristics

| Microstructure (μm) | Retroreflectivity (cd/m²/lux) | Water contact angle (°) | Water droplet appearance |
|---|---|---|---|
| Standard VIP-3990 | 540 | 53 | Round Shape |
| A. VIP-3990 laminated with PMMA micro-grooved film: | | | |
| 4-12-4 | 129 | 42 | Slightly elongated |
| 4-1.5-5 | 23 | 18 | Elongated along grooves |
| 4-4-5 | 60 | 19 | Elongated along grooves |
| 4-8-3 | 94 | 36 | Slightly elongated |
| 2-4-3 | 37 | 17 | Elongated along grooves |
| 2-8-3 | 42 | 24 | Elongated along grooves |
| 2-8-5 | 48 | 31 | Elongated along grooves |

TABLE IV-continued

Micro-Groove Film Retroreflectivity and Surface Characteristics

| Microstructure ($\mu$m) | Retroreflectivity (cdl/m²/lux) | Water contact angle (°) | Water droplet appearance |
|---|---|---|---|
| B. VIP-3990 laminated with PMMA micro-grooved film and coated with silica-containing polymer: | | | |
| 4-12-4 | 153 | 47 | |
| 4-1.5-5 | 251 | 47 | |
| 4-4-5 | 274 | — | |
| 4-8-3 | 251 | — | |
| 2-4-3 | 318 | 45 | |
| 2-8-3 | 221 | 44 | |
| 2-8-5 | 192 | 47 | |
| C. *VIP-3990 laminated with PMMA micro-grooved film, coated, and corona treated: | | | |
| 4-12-4 | 158 | | 6 |
| 4-1.5-5 | 275 | | 6 |
| 4-4-5 | 230 | | 5 |
| 4-8-3 | 238 | | 8 |
| 2-4-3 | — | | 6 |
| 2-8-3 | — | | 6 |
| 2-8-5 | — | | 6 |

*retroreflectivity variations such as those observed between a sample before and after corona treatment may be caused from measuring different area on coating.

As can be seen from Tables III and IV, the laminates with uncoated square-wave grooved films have poor reflectivity properties, thus making these grooved films unacceptable as coverings on retroreflective substrates such as traffic signs. In contrast, the laminates with coated (i.e. patterned) films exhibited acceptable levels of retroreflectivity.

Abrasion Resistance Test:

Abrasion resistance of the patterned hydrophilic and hydrophobic article on retroreflective sheeting was evaluated by a Taber™ Abraser model-503, obtained from Teledyne Taber, at North Tonawanda, N.Y. equipped with a 500 gm weight and a Calibrase™ CS-17 abrasive wheel from the same manufacturer Retroreflectivity of test samples was measured, as previously described, at the abraded area before and after the abrasion test. Abrasion resistance was determined by the percentage retention of retroreflectivity. The retroflectivity values are qualitatively accurate but show variability (e.g., slightly greater brightness for some of the abraded coated samples) that may be due to measurements taken at different points on the surface where there is a slightly different thickness in the applied coating. The data shows better abrasion resistance for the coated films

TABLE V

Abrasion Resistance of Micro-Groove Film Laminated on VIP-3990

| Micro-Structure ($\mu$m) | Taber Abrasion (No. Of Cycles) | Retroreflectivity Retention (%) Without Coating | Retroreflectivity Retention (%) With Coating & Post Corona Treatment |
|---|---|---|---|
| 4-12-4 | 0 | — | — |
| | 10 | 53 | 113 |
| | 20 | 53 | 100 |
| 4-1.5-5 | 0 | — | — |
| | 10 | 33 | 90 |
| | 20 | 33 | 100 |
| 4-4-5 | 0 | — | — |
| | 10 | 25 | 95 |
| | 20 | 25 | 95 |
| 4-8-3 | 0 | — | — |
| | 10 | 32 | 103 |
| | 20 | 32 | 106 |
| 2-4-3 | 0 | — | — |
| | 10 | 33 | 125 |
| | 20 | 33 | 114 |
| 2-8-3 | 0 | — | — |
| | 10 | 29 | 100 |
| | 20 | 29 | 100 |
| 2-8-5 | 0 | — | — |
| | 10 | 25 | 100 |
| | 20 | 25 | 108 |

Anti-dew (or water spreading) test:

A simulated dew environment was used to evaluate the retroreflectivity of retroreflective sheeting having a patterned hydrophilic/hydrophobic coating. Patterned test samples were prepared as described above. The dew simulator included an aluminum test deck mounted on a rectangular galvanized steel wall that was inside an insulated enclosure. Test samples were mounted on the test deck. The galvanized wall and test deck was cooled to 5° C. to 15° C. with a heat exchanger. A humidifier was used to provide humidity to the cooled test panels.

Retroreflectivity of test samples in the dew simulator was evaluated by shining a flash light held close to the nose at samples from a distance of about 10 meters. The flash light can be moved to the right and to the left to check the retroreflectivity at different entrance angles. The moisture condensation test was conducted for about 60–80 minutes in the dew simulator. Sample brightness was rated on a scale of 1 (poor) to 5 (excellent) retroreflectivity in dry or in dew conditions.

5 excellent, no change from initial sheeting brightness.

4 good, slight decrease from initial sheeting brightness.

3 acceptable, significant decrease of brightness.

2 fair, considerable decrease of brightness.

1 poor, sample reflected little or no light.

Anti-frost test:

The anti-frost property of retroreflective sheeting was evaluated as for the anti-dew test except the galvanized wall temperature was cooled to 0° C. to −5° C. The chamber double-side glass door was slightly opened to allow humidity in the air to condense on the test sample surface. Anti-frost property was also rated on a scale from 1 to 5. The results are shown in Table VI.

TABLE VI

Anti-Dew and Anti-Frost Property Test of Patterned Hydrophilic and Hydrophobic Films

| Microstructure ($\mu$m) | Brightness in Dry | Brightness in Dew | Brightness in Frost |
|---|---|---|---|
| Standard VIP-3990 | 5 | 1 | 1 |
| 4-12-4 | 4 | 4 | 3 |
| 4-1.5-5 | 5 | 5 | 3 |
| 4-4-5 | 4 | 4 | 4 |
| 4-8-3 | 5 | 5 | 4 |
| 2-4-3 | 5 | 5 | 3 |

TABLE VI-continued

Anti-Dew and Anti-Frost
Property Test of Patterned Hydrophilic and Hydrophobic Films

| Microstructure ($\mu$m) | Brightness in Dry | Brightness in Dew | Brightness in Frost |
|---|---|---|---|
| 2-8-3 | 4 | 4 | 3 |
| 2-8-5 | 5 | 5 | 3 |

Various modifications and alterations of this invention will become apparent to those skilled in the art without departing from the scope and spirit of this invention. It therefore should be understood that this invention is not unduly limited to the illustrative embodiments described above, but is to be controlled by the limitations set forth in the claims and equivalents thereof.

All patents and patent applications cited above are wholly incorporated by reference herein.

What is claimed:

1. A retroreflective article having a patterned surface with a plurality of alternating hydrophilic and hydrophobic regions on the surface, wherein at least the hydrophilic regions comprise a polymeric matrix comprising inorganic oxide particles and have a greater concentration of exposed inorganic oxide particles than the hydrophobic regions.

2. The article of claim 1 wherein the inorganic oxide particles include silica.

3. The article of claim 2 wherein the polymeric matrix comprises a fluoropolymer.

4. The article of claim 2 wherein the polymeric matrix having inorganic oxide particles comprises about 30 weight percent to 90 weight percent silica particles.

5. The article of claim 2 wherein the inorganic oxide particles further comprise alumina or aluminate.

6. The article of claim 1 wherein the hydrophilic surface regions alternate and have dimensions of width and length and wherein the widths of the hydrophobic surface regions are less than 20 $\mu$m.

7. The article of claim 1 wherein the hydrophobic surface regions have a static water contact angle of more than 40° and the hydrophilic surface regions have a static water contact angle of less than 30°.

8. The article of claim 1 wherein the hydrophilic surface region comprises inorganic oxide particles exposed to the atmosphere and the hydrophobic surface region is essentially without inorganic oxide particles, and wherein the inorganic oxide particles comprise silica particles.

9. The article of claim 1 wherein the hydrophobic region comprises the top surface of a square wave patterned film having grooves, the grooves being filled with a silica-containing polymer to form a hydrophilic surface region in which the silica-containing polymer has a higher concentration of silica particles at the exposed surface relative to the interior thereof.

10. The article of claim 9 wherein the silica-containing polymer comprises an acrylate polymer; and wherein the grooves of the square wave patterned film are straight and have a depth of between about 1 $\mu$m and about 5 $\mu$m.

11. The article of claim 1 wherein the article retroreflects at least 50% of the intensity of visible light that is observed from the retroreflective sheeting alone, when measured at an entrance angle of −4° and an observation angle of 0.2°.

12. A retroreflective article having a patterned surface with a plurality of alternating hydrophilic and hydrophobic regions on the surface in which the hydrophobic regions have widths of less than about 20 $\mu$m and the hydrophilic regions have a static water contact angle of less than 30°.

13. The article of claim 12 wherein the hydrophobic and hydrophilic regions have widths between about 2 $\mu$m and about 10 $\mu$m.

14. The article of claim 13 wherein the hydrophilic surface regions comprise silica particles exposed to the atmosphere.

15. An article having a patterned surface with a plurality of alternating hydrophilic and hydrophobic regions on the surface, comprising a hydrophobic polymer having alternating elevated surfaces and recessed grooves, and a hydrophilic material disposed in the recessed grooves such that a major surface of the article has exposed alternating regions of the hydrophobic polymer and the hydrophilic material, wherein the hydrophilic regions have a static water contact angle of less than 30°.

16. A method of making a polymeric article having a patterned surface with a plurality of alternating hydrophobic and hydrophilic regions, comprising:
    dispersing inorganic oxide particles in a polymer precursor composition to form a coating compostion;
    applying the coating composition to a substrate;
    curing the coating composition to form inorganic oxide particles in a polymer matrix; and
    treating a portion of the cured coating composition to remove the polymer matrix to increase exposure of inorganic oxide particles on the surface of the coating to form the hydrophilic regions of the patterned surface.

17. The method of claim 16 wherein the inorganic oxide particles are silica particles.

18. The method of claim 16 wherein the treatment is selected from the group consisting of corona treatment, plasma treatment, and laser treatment.

19. The method of claim 16 wherein the substrate has a grooved surface having recessed areas and surface areas and wherein the coating composition is deposited in the recessed areas but not on the surface areas; and wherein the cured coating composition and the surface areas of the grooved substrate are exposed simultaneously to a corona or a plasma treatment.

20. The method of claim 16 wherein a screen masks selected areas of the cured coating composition from the treatment.

21. The method of claim 16 wherein the polymer precursor composition comprises an aqueous polymer dispersion or a radiation curable resin.

22. A method of making a dew or frost resistant retroreflective sheeting, comprising the step of applying the article of claim 1 to a surface of a retroreflective sheeting.

23. The method of claim 16 wherein the hydrophilic regions are less than 20 $\mu$m wide.

24. The article of claim 12 wherein said article has a major surface that adjoins a substrate and wherein the substrate is selected from the group consisting of retroreflective sheeting, windows, mirrors, surgical goggles and scuba masks.

25. The article of claim 15 wherein said article has a major surface that adjoins a substrate and wherein the substrate is selected from the group consisting of retroreflective sheeting, windows, mirrors, surgical goggles and scuba masks.

26. A retroreflective sheeting that has the article of claim 15 disposed thereon.

27. An article having a plurality of alternating hydrophilic and hydrophobic regions on the surface, wherein at least the hydrophilic regions comprise a polymeric matrix comprising an acrylate and inorganic oxide particles and have a greater concentration of exposed inorganic oxide particle than the hydrophobic regions.

28. An article having a patterned surface with a plurality of alternating hydrophilic and hydrophobic regions on the surface, comprising a hydrophobic polymer having alternating elevated surfaces and recessed grooves, and a hydrophilic material having exposed inorganic oxide particle disposed in the recessed grooves such that a major surface of the article has exposed alternating regions of the hydrophobic polymer and the hydrophilic material.

29. The article of claim 1 wherein the hydrophilic surface regions have a hydrophilic static contact angle of less than 20°.

30. The article of claim 12 wherein the hydrophilic surface regions have a hydrophilic static contact angle of less than 20°.

31. The article of claim 15 wherein the hydrophilic surface regions have a hydrophilic static contact angle of less than 20°.

32. The article of claim 1 wherein the hydrophilic surface regions have a hydrophilic static contact angle of less than 15°.

33. The article of claim 12 wherein the hydrophilic surface regions have a hydrophilic static contact angle of less than 15°.

34. The article of claim 15 wherein the hydrophilic surface regions have a hydrophilic static contact angle of less than 15°.

35. The article of claim 12 wherein said article retroreflects at least 70% of the intensity of visible light that is observed from the retroreflective sheeting alone, when measured at an entrance angle of −4° and an observation angle of 0.2°.

* * * * *

UNITED STATES PATENT AND TRADEMARK OFFICE
CERTIFICATE OF CORRECTION

PATENT NO. : 6,352,758 B1
DATED : March 5, 2002
INVENTOR(S) : Huang, Tzu-Li J.

It is certified that error appears in the above-identified patent and that said Letters Patent is hereby corrected as shown below:

Column 3,
Line 60, delete "(em)" and insert in place thereof -- ($\mu$m) --.

Column 4,
Line 42, add -- . -- after "substrate".

Column 6,
Line 14, delete "Ludo™" and insert in place thereof -- Ludox™ --.

Column 8,
Line 54, delete "2 to 59" and insert in place thereof -- 2 to 5 --.

Column 12,
Line 34, delete "Waterbome" and insert in place thereof -- Waterborne --.

Signed and Sealed this

Eighth Day of October, 2002

Attest:

Attesting Officer

JAMES E. ROGAN
*Director of the United States Patent and Trademark Office*